May 14, 1957     F. CELORIO MENDOZA     2,791,975

MACHINES FOR TREATING DOUGH

Filed Sept. 21, 1953     3 Sheets—Sheet 1

INVENTOR

FAUSTO CELORIO MENDOZA,

BY Ogle R. Singleton

ATTORNEY

May 14, 1957
F. CELORIO MENDOZA
2,791,975
MACHINES FOR TREATING DOUGH
Filed Sept. 21, 1953
3 Sheets-Sheet 2
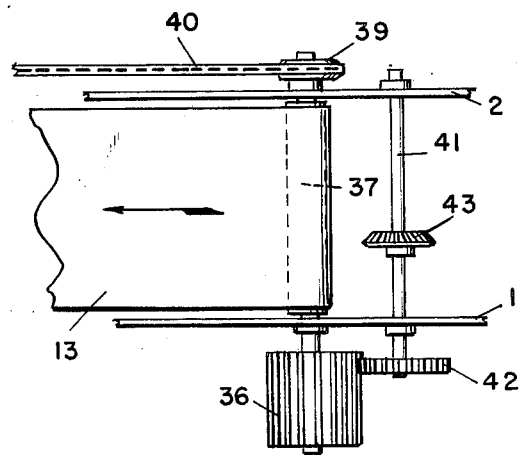
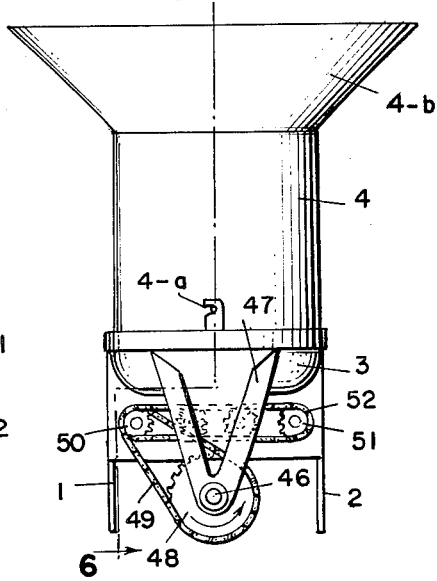
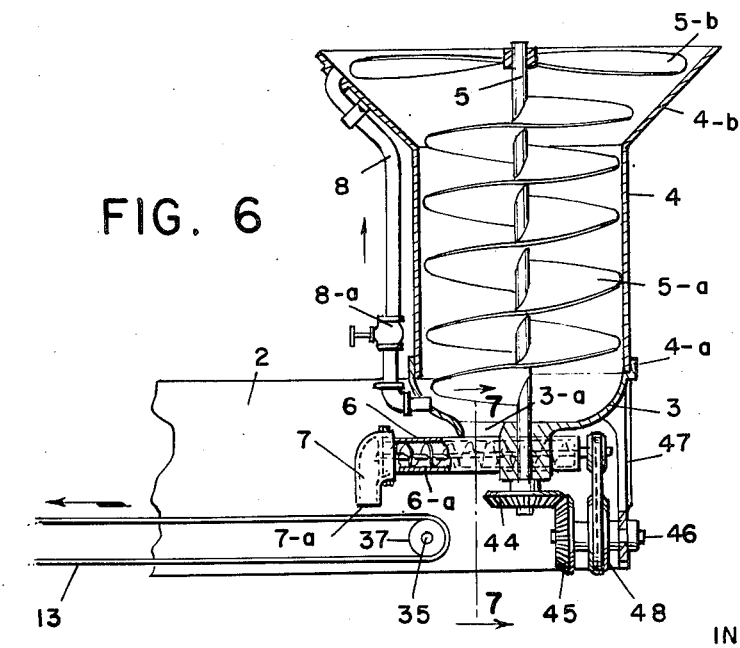
INVENTOR
FAUSTO CELORIO MENDOZA,
BY *Ogle R. Singleton*
ATTORNEY May 14, 1957 F. CELORIO MENDOZA 2,791,975
MACHINES FOR TREATING DOUGH
Filed Sept. 21, 1953 3 Sheets-Sheet 3

INVENTOR
FAUSTO CELORIO MENDOZA,
BY Ogle R. Singleton
ATTORNEY

United States Patent Office 2,791,975
Patented May 14, 1957

2,791,975
MACHINES FOR TREATING DOUGH

Fausto Celorio Mendoza, Mexico City, Mexico

Application September 21, 1953, Serial No. 381,451

4 Claims. (Cl. 107—14)

My invention consists in a new and useful improvement in machines for treating dough, more particularly for producing tortillas. My improved machine has a bin to which dough which is to be treated is fed. In this bin there is a worm which forces the dough toward a receptacle in the lower end of the machine. The dough is forced through this receptacle and is moved horizontally by a series of worms which operate simultaneously to force the dough through a slot at the bottom of the machine, to form a sheet which may be either a continuous strip or may be cut into desired shapes for cakes, crackers or other products, without there being left in the slot any of the dough as is usual in known machines. Hence, the production of cakes or crackers is achieved continuously without waste of dough as happens in known machines. Various types of machines for making cakes, crackers, etc. have rollers which press the dough into a sheet which is wound about one of the rollers, and a cake is cut, detached from the sheet and falls on a conveyer belt, but generally the residue of the dough adhered to the roller is torn and falls down, which requires stoppage of the operation. This can not happen in the machine herein described which has been improved by having a slot through which the dough is forced, without any waste.

One of the known methods of making cakes, other than by hand, is to press a ball of dough between two plates, limiting the shape of the cake or allowing it to take an irregular shape. Such a method, in addition to being very slow and imperfect, has many difficulties such as the cake adhering to the surfaces of the plates. In such an event, the cake is torn or cannot be separated easily and its making becomes imperfect which is quite frequently due to the degree of dampness of the dough. Such a result is prevented in my improved machine in which cakes forced out through the slot descend by gravity to a feed belt which conveys them to the cooking pans. This method is a great improvement over known methods since it is continuous and automatic. Moreover, by use of my machine it is not necessary for the dough to have a determined plasticity or dampness. On the contrary, the cakes can be made with dough of any degree of dampness, without there being any imperfections in their shape.

Among the advantages obtained with my improved machine, herein described, are the continuous feed of the dough by the worms to the slot through which the dough descends in the form of a sheet, and the shaping by means of a cutter which is synchronized with the feed and which discharges slowly and in desired form the cakes which descend to the feed belt which automatically carries them to the cooking pans.

The cakes thus produced have been improved because the worms which feed the dough act as a mixer or kneader, and hence the dough is more uniform, and the automatic and continuous production produces a more satisfactory result in comparison with cakes in which the dough is not uniform. By known methods generally cakes are made of dough either too dry or too damp, and, after baking, the cakes are either too dry or are raw. By shaping the cakes at the exit of the slot of the machine by an adjustable gate which affords a larger or smaller passage for the dough through the slot, and also by means of which the cakes can be shaped, an advantageous result is secured because it avoids waste of dough, as the gate controls the flow and at the same time may shape the cakes.

The details of my invention are clearly set forth in the following description and the drawings. It is to be distinctly understood that I do not consider my invention to be limited to the details of the specific embodiment of my invention disclosed by the following description and the drawings, but refer for its scope to the claims appended hereto.

In the drawings:

Fig. 4 is a fragmentary top plan of the feed belt.

Fig. 5 is an end elevation of the machine.

Fig. 6 is a vertical section on the line 6—6 of Fig. 5, in the direction of the arrows, the gate being omitted in this view.

Figure 1:
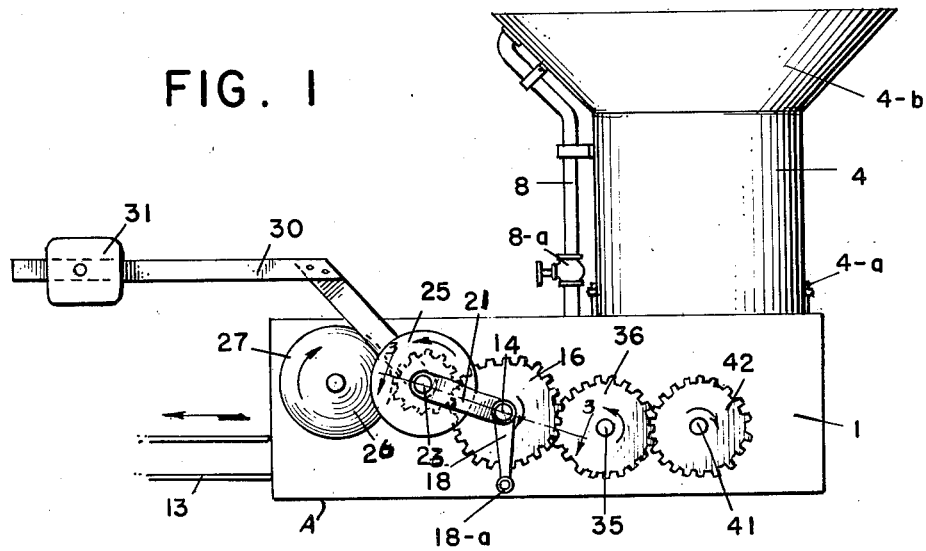
Fig. 1 is a side elevation of the machine.

As illustrated in the drawings, my improved machine has a base A composed of side plates 1 and 2 in which is suitably mounted a receptacle 3 carrying a suitable bin 4 removably mounted in the top of the receptacle 3 and having hooks 4–a pivoted on receptacle 3 and engaging pins on bin 4. The bin 4 has an inverted frusto-conical feed portion 4–b at its upper end. A shaft 5 is journaled concentrically in a bearing formed integrally with the bottom of the receptacle 3, extends upwardly through bin 4 and feed portion 4–b, and has thereon a feed worm 5–a in the bin 4 and propeller blades 5–b in the portion 4–b.

The receptacle 3 has a discharge port 3–a communicating with a series of four horizontal discharge tubes 6 in each one of which there is disposed a feed worm 6–a. The tubes 6 debouch into a manifold 7 bolted to the outer ends of tubes 6 and having a downwardly turned discharge throat 7–a in the form of a rectangular slot extending transversely of the machine's base A between the side plates 1 and 2. The receptacle 3 and feed portion 4–b are connected by a pipe 8 with valve 8–a co-acting with throat 7–a to control discharge of dough from receptacle 3.

Figure 2:
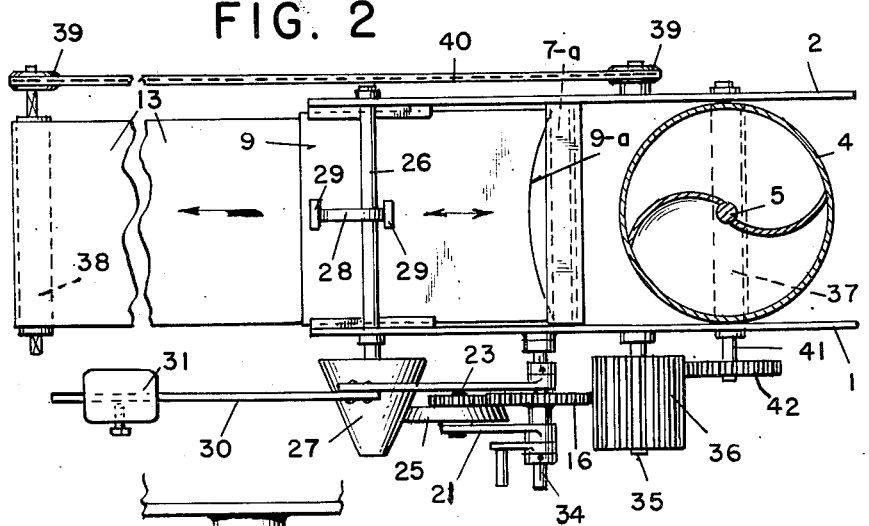
Fig. 2 is a top plan of the machine, the upper portion of the bin being broken away.
Figure 8:
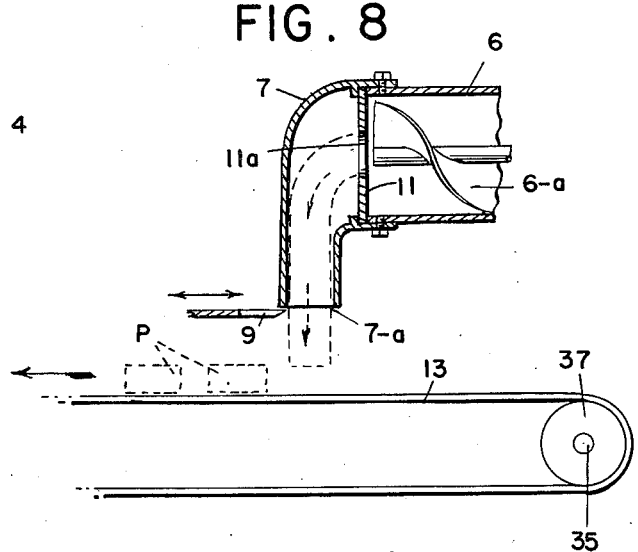
Fig. 8 is an elevation view partly in section of the discharge tube, manifold therefor, gate and conveyor.
Figure 9:
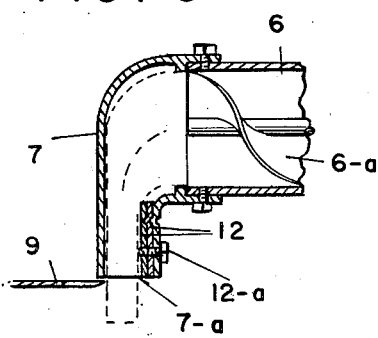
Fig. 9 is a view similar to Fig. 8 showing modification of the parts.
Figure 12:
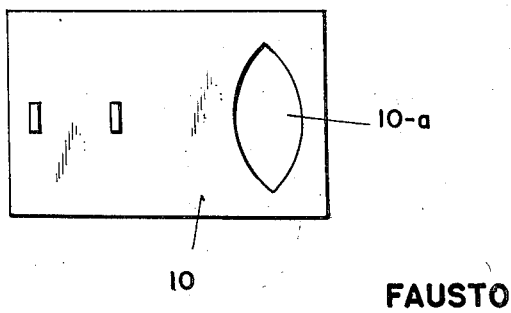
Fig. 12 is a top plan of a modified form of control gate.

The machine is provided with a control gate 9 to co-act with the throat 7–a (Figs. 2, 8 and 9). The gate 9 is suitably mounted in the frame A for horizontal reciprocation and has an arcuate cutting edge 9–a. A plurality of gates, such as gate 10 (Fig. 12) can be provided. Each gate 10 has an orifice 10–a through which the dough passes from the throat 7–a.

Figure 10:
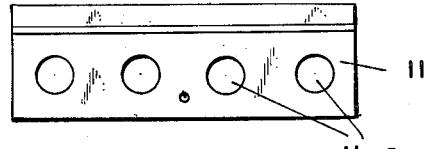
Fig. 10 is a front elevation of a baffle plate.

I provide a baffle plate 11 (Fig. 10) which can be disposed in manifold 7 adjacent the discharge ends of the tubes 6, having openings 11–a registering with the tubes 6. The plate 11 is removably mounted in place by lugs 7-b formed on the interior of manifold 7 and clamping plate 11 against the ends of tubes 6 (Fig. 8).

Figure 11:
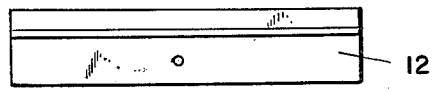
Fig. 11 is a front elevation of a filler plate.

I provide a plurality of filler plates 12 (Figs. 9 and 11) which can be mounted in the throat 7-a by bolts 12-a, to vary the width of the throat 7-a.

I provide a feed belt 13 disposed below the throat 7, to remove the products P (Fig. 8) from the machine.

Figure 3:
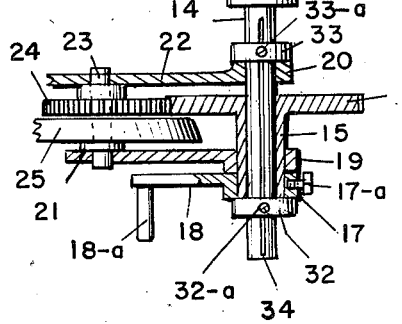
Fig. 3 is an enlarged section on the line 3—3 of Fig.1, in the direction of the arrows.
Figure 7:
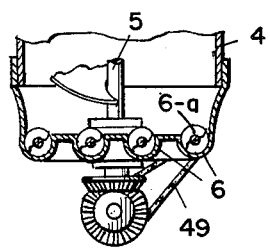
Fig. 7 is a vertical section on the line 7—7 of Fig. 6, in the direction of the arrows.

I will now describe the means which I provide for operating the above described structural elements of my improved machine. Suitably fixed on the plate 1 of the base A, there is a trunnion 14 carrying a sleeve 15 integral with which is a gear 16. A collar 17 is removably mounted on the sleeve 15 by a set-screw 17-a and has an operating crank 18 with handle 18-a. A pair of collars 19 and 20 are loosely mounted on the sleeve 15 and trunnion 14, respectively, on opposite sides of the gear 16. Crank arms 21 and 22 are carried by the collars 19 and 20, respectively, and have suitably journaled therein a shaft 23. A gear 24 is fixed on the shaft 23 and meshes with the gear 16. A frusto-conical, friction pulley 25 is also fixed on the shaft 23. A shaft 26 is suitably journaled in plates 1 and 2 above the gate 9 and has fixed thereon a friction cone pulley 27 engaged by the pulley 25. The shaft 26 has fixed thereon a cam 28 co-acting with a pair of upstanding lugs 29 on gate 9 to reciprocate the gate 9 when the shaft 26 is rotated. The crank arm 22 has mounted thereon a lever 30 with an adjustable weight 31 adapted to force the pulley 25 into driving engagement with the cone pulley 27. A pair of collars 32 and 33 are slidably mounted on the trunnion 14 adjacent collars 17 and 20, respectively, with set-screws 32-a and 33-a received in a slot 34 in the trunnion 14 (Fig. 3), to permit displacement of the pulley 25 axially.

A shaft 35 (Figs. 1, 2 and 4) is suitably journaled in the plates 1 and 2 and has fixed thereon a wide-face gear 36 meshing with the gear 16. A roller 37 is fixed on the shaft 35 between the plates 1 and 2 (Fig. 4). A second roller 38 (Fig. 2) is suitably journaled at the desired point outside of the machine. The feed belt 13 is roved about rollers 37 and 38 and is driven by any suitable driving means, such as sprocket wheels 39 and sprocket chain 40 driven by shaft 35.

A shaft 41 (Figs. 1, 2 and 4) is journaled in plates 1 and 2 below the receptacle 3 and has fixed thereon a gear 42 meshing with gear 36, and also has fixed thereon a miter gear 43 meshing with a miter gear 44 (Fig. 6) on the lower end of the shaft 5. The gear 44 meshes with a miter gear 45 on a shaft 46 journaled in a bracket 47 depending from the receptacle 3. The shaft 46 has fixed thereon a sprocket wheel 48 connected by a sprocket chain 49 with sprocket wheel 50 on one of the worms 6-a. The other three worms 6-a have sprocket wheels 51 and a sprocket chain 52 to be driven by a second sprocket wheel on the first mentioned worm 6-a.

Having described the structural details of my improved machine, I will now describe its use and operation. Dough is placed in the bin 4 through the feed portion 4-b and is forced downwardly into the receptacle 3 by the blades 5-b and the worm 5-a which are rotated by shaft 5 driven by its actuating gearing which is energized manually from the handle 18-a. The dough is forced through the discharge port 3-a of the receptacle 3 into the tubes 6 through which it is forced by the worms 6-a, rotated by their actuating gearing also energized by the handle 18-a. The dough is forced into the manifold 7 and thence through the throat 7-a.

It is obvious that use of the baffle plate 11 will restrict the passage of the dough to four streams corresponding to the tubes 6. Removal of the plate 11 will cause the dough to move en masse into the manifold 7. It is also obvious that the width of the throat 7-a can be varied by use of the plates 12.

The dough extruded through the throat 7-a constitutes a sheet which can be transversely cut by the blade 9-a of the gate 9 reciprocated by its actuating gearing, energized by the handle 18-a. It is obvious that the adjustment of the gearing on trunnion 14, axially thereof, adjusts the pulley 25 relative to the pulley 27, varying the speed of rotation of the shaft 26, functioning of cam 28, and consequently the time intervals of the cutting strokes of gate 9. It is obvious that such adjustment can determine the thickness of the fractions of the sheet of dough comprising the products P which pass by gravity to the feed belt 13 (Fig. 8) to be removed from the machine by the belt 13 driven by its actuating gearing energized by the handle 18-a.

By substituting the gate 10 with opening 10-a, and properly adjusting the timing of the gate 10, the dough can be caused to pass through the opening 10-a assuming its configuration. In this manner the machine can produce cakes, etc. having the desired shape.

It is obvious that the pipe 8 controlled by its valve 8-a serves to control the pressure on the dough to prevent undesirable conditions as to its consistency and form.

Having described my invention, what I claim is:

1. In a machine for producing tortillas, the combination of a chamber having in its bottom a discharge port; a plurality of discharge tubes communicating with said port; means adapted to extrude under pressure the material for making the tortillas from said chamber into said tubes; a manifold with which said tubes communicate having a rectangular downwardly turned discharge slot; means adapted to extrude under pressure the material extruded into said tubes, through said tubes and said manifold, to produce a curtain of said material passing downwardly from said slot; a slidable discharge gate comprising a horizontally disposed plate below the lower edge of said slot, said plate having an orifice, said manifold and said plate being so related that said material is confined in said manifold when the plate is in one position and that a fraction of said material is extruded from said manifold through said slot and said orifice when said plate is in another position; and means adapted to slide said plate into and out of said two positions.

2. A machine, according to claim 1, having means adapted to vary the width of said slot.

3. A machine, according to claim 1, having means adapted to vary the speed of sliding movement of said gate.

4. A machine, according to claim 1, having means adapted to vary the degree of pressure on the material by said extruding means.

References Cited in the file of this patent

UNITED STATES PATENTS

| | | |
|---|---|---|
| 533,655 | Lomax | Feb. 5, 1895 |
| 598,404 | Weichert | Feb. 1, 1898 |
| 738,242 | Romero et al. | Sept. 8, 1903 |
| 1,156,096 | Price | Oct. 12, 1915 |
| 1,337,871 | Wolff | Apr. 20, 1920 |
| 1,467,979 | Paisolli | Sept. 11, 1923 |
| 2,261,977 | Deutsch | Nov. 11, 1941 |
| 2,342,093 | Weida | Feb. 15, 1944 |
| 2,588,196 | Barbieri | Mar. 4, 1952 |

FOREIGN PATENTS

| | | |
|---|---|---|
| 260,398 | Germany | May 24, 1913 |
| 618,521 | France | Mar. 11, 1927 |